(12) United States Patent
Zurek et al.

(10) Patent No.: US 6,453,045 B1
(45) Date of Patent: Sep. 17, 2002

(54) TELECOMMUNICATION DEVICE WITH PIEZO-ELECTRIC TRANSDUCER FOR HANDSFREE AND PRIVATE OPERATING MODES

(75) Inventors: Robert A. Zurek, Antioch, IL (US); Thomas Gitzinger, Woodstock, IL (US); Michael L. Charlier, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/497,983

(22) Filed: Feb. 4, 2000

(51) Int. Cl.⁷ .................................................. H04M 1/00
(52) U.S. Cl. ............................. 379/433.02; 379/420.02
(58) Field of Search ...................... 379/433.02, 420.02; 381/190; 455/90, 575

(56) References Cited

U.S. PATENT DOCUMENTS

| | | |
|---|---|---|
| 4,430,529 A | 2/1984 | Nakagawa et al. |
| 4,593,160 A | 6/1986 | Nakamura |
| 4,694,446 A | 9/1987 | Koike |
| 5,517,574 A | 5/1996 | Tichy |
| 5,524,061 A | 6/1996 | Mooney et al. |
| 5,650,763 A | 7/1997 | McKee et al. |
| 6,144,738 A * | 11/2000 | Hawker et al. ........ 379/433.02 |

* cited by examiner

Primary Examiner—Jack Chiang
(74) Attorney, Agent, or Firm—Daniel R. Collopy; Lawrence J. Chapa

(57) ABSTRACT

A telecommunication device (10) includes a housing (14, 16) and a dual earpiece arrangement (26) associated with the housing. The dual earpiece arrangement (26) includes a handsfree transducer (28) that generates dispatch-level audio output in a handsfree operating mode of the telecommunication device, and a private-mode transducer (38) that generates private-level audio output in a private operating mode of the telecommunication device. In particular, the device (10) includes a cantilevered bender (30) having a first end and a second end wherein the first end of the bender is mounted to the housing (16), a diaphragm (32) having a first end and a second end wherein the first end of the diaphragm (32) is attached to the second end of the bender (30), and a surround (34) joining the second end of the diaphragm (32) to the housing (16). The bender (30) drives the diaphragm (32) in a reciprocating manner to generate dispatch level audio output. The private-mode transducer (38) is positioned within a cavity of the diaphragm (32) for generating private-level audio output. At least one of the handsfree transducer (28) and the private-mode transducer (38) is formed with multiple layers, at least some of which include a piezo-electric ceramic material.

21 Claims, 5 Drawing Sheets

TELECOMMUNICATION DEVICE WITH PIEZO-ELECTRIC TRANSDUCER FOR HANDSFREE AND PRIVATE OPERATING MODES

BACKGROUND OF THE INVENTION

The present invention relates to the telecommunications arts. The preferred embodiment of the invention finds particular application in conjunction with a portable telecommunication device such as an analog or digital cellular, wireless, etc. telephone with a piezo-electric transducer for handsfree and private operating modes, and will be described with particular reference thereto. However, the present invention finds application with other devices such as pagers, personal organizers, portable CD/DVD players, portable or palm-top computers, etc.

The handsfree mode of operation refers to the ability of a device to generate dispatch-level audio output, whereas the private mode of operation refers to the ability of a device to generate private-level audio output. It is desirable to provide portable (e.g. hand held) devices with both handsfree and private operating modes. It is also desirable to provide portable devices with small form factors. However, in small form factor devices, the space available to house both handsfree and private mode transducers is acoustically small.

That is, a conventional speaker includes a fairly compliant or flexible structure that can be modeled as a weak spring having a low stiffness. In contrast, a small, enclosed volume of air can be modeled as a spring having a low compliance or an extremely high stiffness. Accordingly, an acoustically small space, such as those found in most portable devices, has a very high stiffness. If a conventional speaker, having a low stiffness, is mounted within a volume of air having a greater stiffness than the speaker, the volume of air acts to disadvantageously shift the resonance of the speaker higher, thereby limiting the effective audio bandwidth in a handsfree operating mode.

Accordingly, it is considered desirable to provide a new and improved telecommunication device with a piezo-electric transducer for handsfree and private operating modes, that meets the above-stated needs and overcomes the foregoing difficulties and others while providing better and more advantageous results.

SUMMARY OF THE INVENTION

In accordance with one aspect of the present invention, a device for generating dispatch-level audio output in a handsfree operating mode is disclosed. The device includes a housing, a cantilevered bender having a first end and a second end wherein the first end of the bender is mounted to the housing, a diaphragm having a first end and a second end wherein the first end of the diaphragm is attached to the second end of the bender, and a surround joining the second end of the diaphragm to the housing. The bender drives the diaphragm in a reciprocating manner to generate dispatch level audio output.

In accordance with another aspect of the present invention, a telecommunication device is disclosed. The telecommunication device includes a housing and a dual earpiece arrangement associated with the housing. The dual earpiece arrangement includes a handsfree transducer that generates dispatch-level audio output in a handsfree operating mode of the telecommunication device, and a private-mode transducer that generates private-level audio output in a private operating mode of the telecommunication device.

One advantage of the present invention is the provision of a telecommunication device including an elastically supported rigid diaphragm driven by a low compliance cantilevered piezo-electric handsfree transducer capable of producing wideband audio in a very small acoustic space.

Another advantage of the present invention is the provision of a telecommunication device including a coaxial handsfree and private mode transducer having two separate piezo-electric elements.

Yet another advantage of the present invention is the provision of a telecommunication device including a coaxial handsfree and private mode transducer having two separate piezo-electric elements incorporated into a single bender assembly.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE PREFERRED EMBODIMENT(S)

Figure 1:
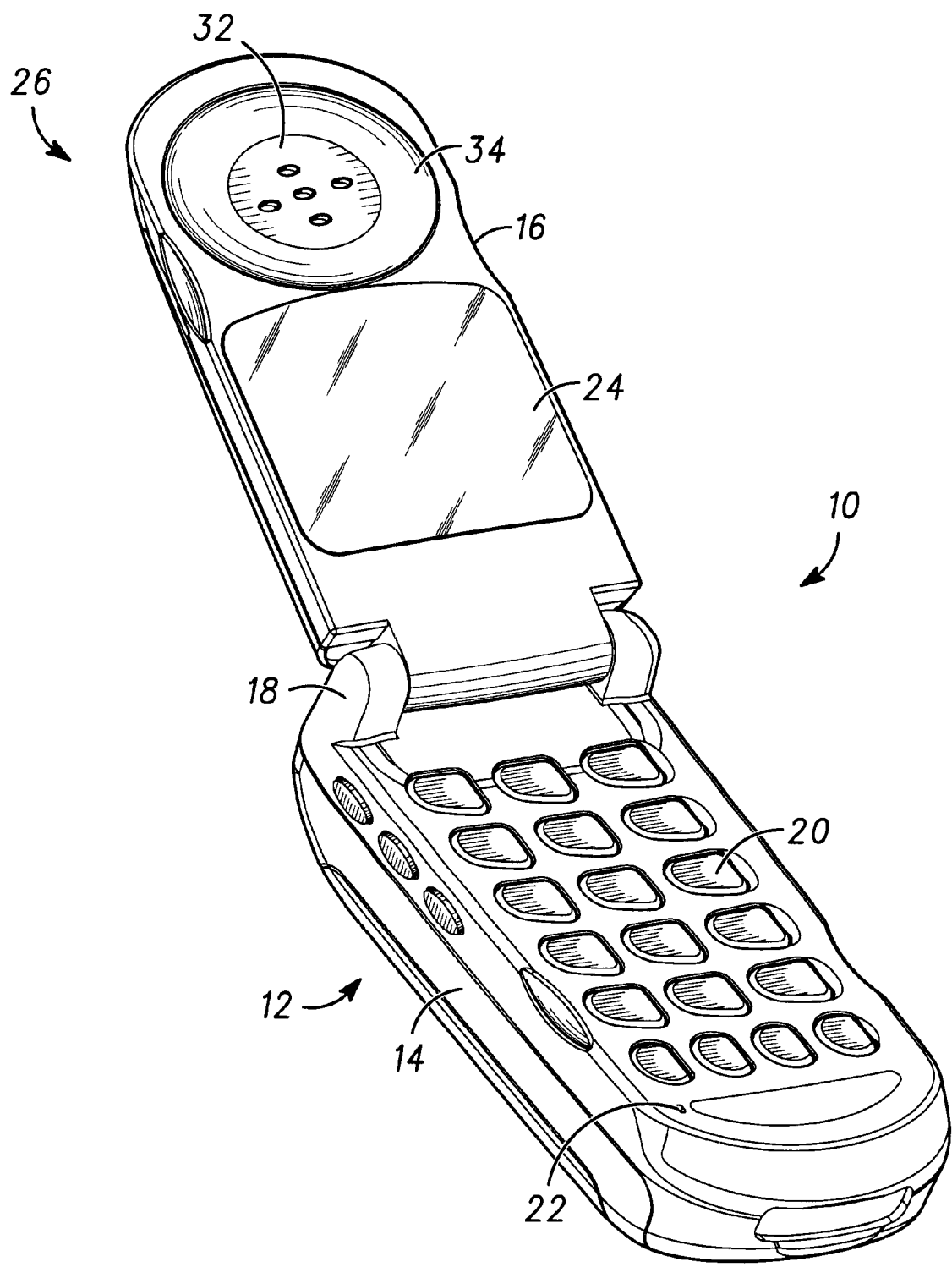
FIG. 1 is a perspective view of an exemplary cellular telephone that incorporates the features of the present invention therein.

Referring now to FIG. 1, an exemplary portable telecommunication device, such as a cellular telephone 10 includes a housing 12 having a base portion 14 and a flip portion 16 pivotally coupled to the base portion by a hinge or knuckle 18. The base portion 14 includes a keypad 20, a mouthpiece 22, and associated circuitry. The flip portion 16 includes a display 24 such as a LCD display, a dual-mode earpiece arrangement 26, and associated circuitry.

Figure 2:
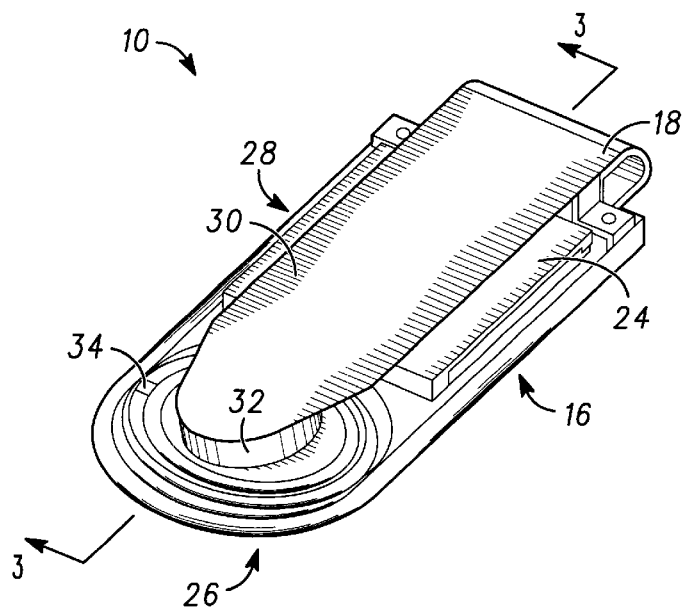
FIG. 2 is a perspective view of a flip portion of the cellular telephone of FIG. 1, with a back cover removed to view a handsfree mode transducer.
Figure 3:
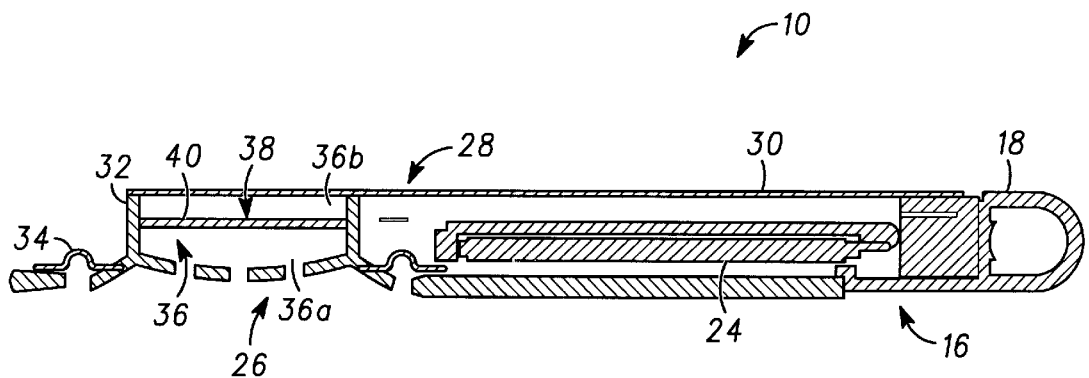
FIG. 3 is a cross-section view of the flip portion and transducer taken along the line 3—3 of FIG. 2.

With reference to FIGS. 2 and 3, the dual-mode earpiece arrangement 26 includes a handsfree-mode transducer 28 having a cantilevered, multi-layered, piezo-electric ceramic bender 30, a loudspeaker diaphragm 32, a compliant surround 34, and associated drive circuitry. The bender 30 is attached at one end thereof to the flip housing 16 proximate the hinge 18. The diaphragm 32 is attached to a second, free end of the bender. The surround 34 joins a forward portion of the diaphragm 32 to a forward portion of the flip housing 16.

The display 24 is mounted to the forward portion of the flip housing in front of the bender 30. Since the bender is mounted behind the display 24, the height of the diaphragm 32 can be increased to define a suitable cavity 36. The dual-mode earpiece arrangement 26 further includes a separate, private-mode transducer 38. In the embodiment being described, the private-mode transducer 38 includes a circular, piezo-electric ceramic bender 40 housed in the cavity 36, attached to associated circuitry for driving the private-mode bender 40. The periphery of the private-mode bender 40 is secured to the inner wall forming the diaphragm 32 so as to divide the cavity 36 into a front cavity 36a and a rear cavity 36b.

When a voltage is applied to the handsfree-mode bender 30, the diaphragm 32 moves either up or down depending on the polarity of the voltage applied. The resonance of the handsfree transducer 28 is determined by i) the stiffness of the bender 30 and surround 34, and ii) the weight of the diaphragm 32, bender 30, and surround 34. The level of audio output generated by the handsfree transducer 28 is determined by i) the type of piezo-electric material selected for the bender 30, ii) the thickness of the bender 30, iii) the mass of the bender 30, diaphragm 32, and surround 34, and iv) the number of layers of piezoelectric material in bender 30.

The use of a piezo-electric bender/diaphragm system results in a handsfree-mode transducer 28 that has a low resonance with a very low compliance. In particular, the high force per voltage characteristic of certain piezo-electric ceramics overcomes the large mass required to achieve a low resonance. The driving force or displacement of the handsfree transducer 28 is provided by the bender 30, but the frequency response of the transducer 28 is determined by the geometry of the diaphragm 32 and material that forms the diaphragm. When designed for phone band use, the material and geometry are chosen so that all diaphragm resonant or break-up modes fall outside of the phone-audio band. The system is designed so that only the piston mode of the combined diaphragm, surround system falls in the phone-audio band.

With a periphery of the private-mode bender 40 secured to the diaphragm 32, a central portion of the private-mode bender 40 moves up and down within the cavity 36 similar to an "oil-can" effect, depending on the polarity of the voltage applied. The acoustic response of the private-mode transducer is tuned by adjusting i) the volume of air in the front cavity 36a, ii) the volume of air in the rear cavity 36b, iii) the porting through the front of the diaphragm 32, and if needed, out the rear cavity 36b and iv) the resonance and damping of the private-mode bender 40.

Figure 4:
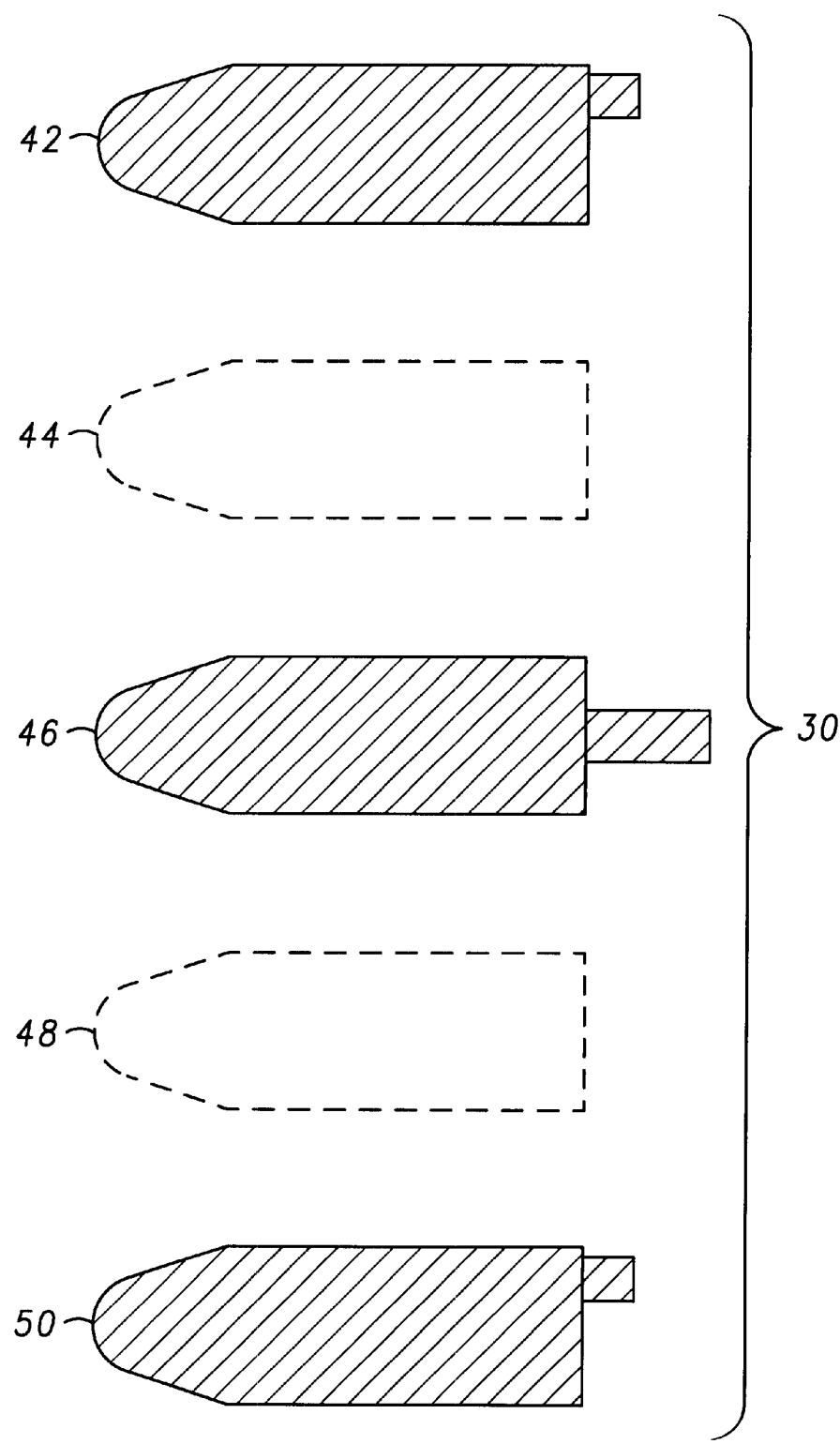
FIG. 4 is an exploded view of a piezo-electric bender associated with the handsfree mode transducer of FIG. 5.

Referring now to FIG. 4, a preferred embodiment of the handsfree-mode bender 30, includes, from top to bottom, a first conductor or conductive layer 42, a first piezo-electric ceramic layer 44, a ground plane 46, a second piezo-electric ceramic layer 48, and a second conductor or conductive layer 50. The first and second conductors 42, 50 and ground plane 46 are preferably constructed of a mesh material, such as nylon mesh, plated with a conductive material, such as nickel plating. However, any suitable substrate and conductive coating (gold, brass, aluminum, etc.) is contemplated. The substrate materials can be selected to aid in the area of damping selectivity.

The first and second piezoelectric layers 44, 48 are oppositely polarized so that when appropriate voltages are applied to the conductive layers 42, 46, 48, the first ceramic layer 44 expands while the second ceramic layer 28 contracts, thus causing the bender 30 to deflect in a forward direction (see FIG. 2). Likewise, when the appropriate voltages are applied to the conductive layers 42, 46, 50, the first ceramic layer 44 contracts while the second ceramic layer 48 expands, thus causing the bender 30 to deflect in a backward direction. The forward and backward deflecting motions of the bender 30 drive the diaphragm 32 to generate dispatch-level audio output.

The damping characteristics of the bender 30 can be optimized by adding one or more elastomeric (e.g. rubber) layers to the bender 30. For instance, a rubberized conductive compound can be applied to one or both sides of one or more layers forming the bender 30, such as the ceramic layers 44, 48. Alternatively, the entire bender can be encased in non-conductive rubberized compound. It is contemplated that the bender 30 can include any number of conductive, piezo-electric, and other layers to optimize the force per voltage characteristic of the bender.

The private-mode transducer 28 can also be formed from a multi-layered structure including one or more conductive layers and piezo-electric ceramic layers, in the same manner shown and described with reference to FIG. 4. Although not shown in FIG. 4, it is contemplated that the trace lines that drive the private-mode transducer 38 can be laminated on the bender 30 and attached to the private-mode drive circuitry near the knuckle 18. It is further contemplated that the piezo-electric ceramic layers of the handsfree-mode transducer 28 and the private-mode transducer 38 can be formed from any one or more of the many suitable piezo-electric ceramic materials known to those of ordinary skill in the art.

Figure 5:
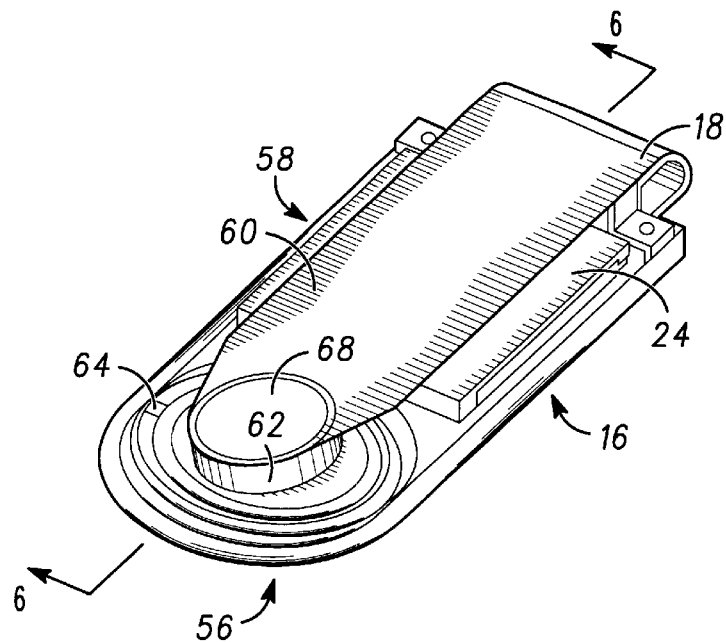
FIG. 5 is a perspective view of a flip portion of the cellular telephone of FIG. 1, with a back cover removed to view a handsfree mode transducer in accordance with another embodiment of the present invention.
Figure 6:
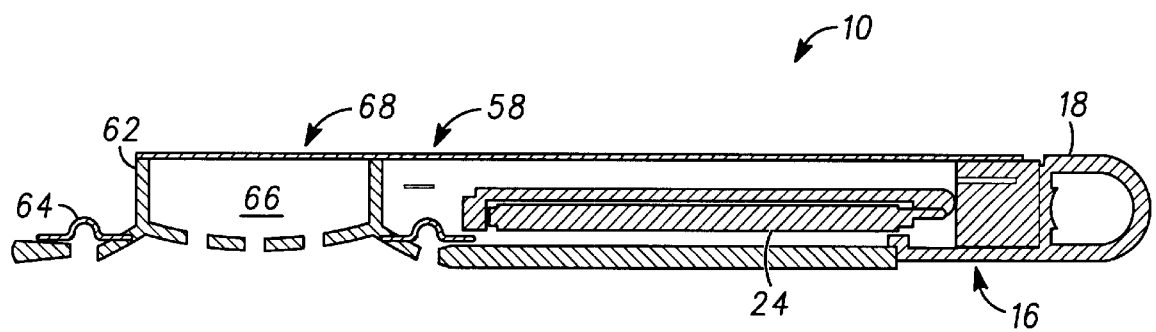
FIG. 6 is a cross-section view of the flip portion and transducer taken along the line 6—6 of FIG. 5.
Figure 7:
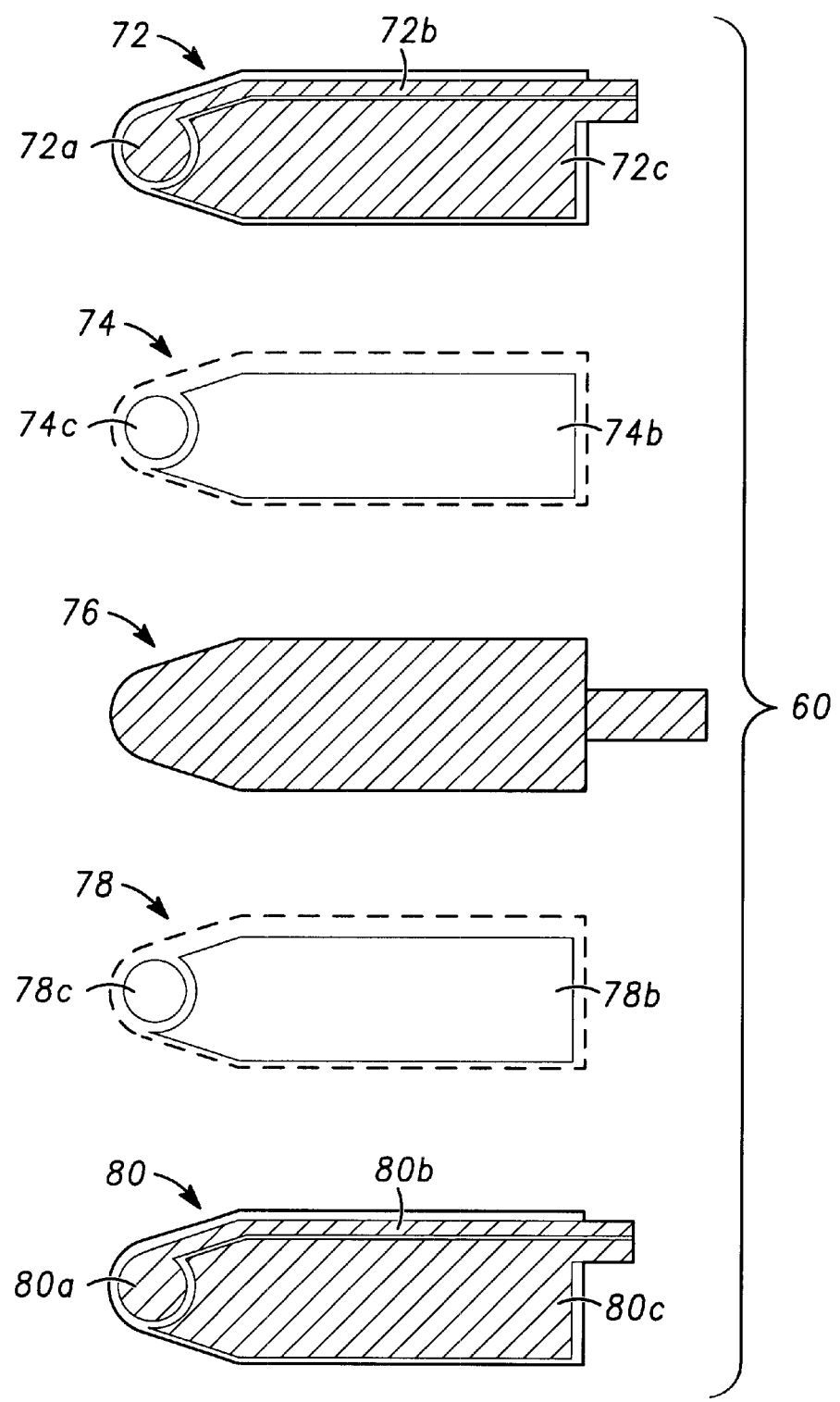
FIG. 7 is an exploded view of a piezo-electric bender associated with the handsfree mode transducer of FIG. 5.

Referring now to the embodiment of FIGS. 5 to 7, wherein like reference numerals denote the same, or substantially similar components illustrated in FIGS. 1 to 4, an alternate dual-mode earpiece arrangement 56 is shown. The earpiece arrangement 56 includes a handsfree transducer 58 having a cantilevered, multi-layered, piezo-electric ceramic bender 60, a loudspeaker diaphragm 62, a compliant surround 64, and associated drive circuitry (not shown). The bender 60 is attached at one end thereof to the flip housing 16 proximate the hinge 18. The diaphragm 62 is attached to a second, free end of the bender. The surround 64 joins a forward portion of the diaphragm 62 to a forward portion of the flip housing 16.

The earpiece arrangement 56 further includes a private-mode transducer 68, and associated drive circuitry. In the embodiment being described, the private-mode transducer 68 takes the form of a circular, piezo-electric ceramic bender formed integral with the handsfree bender 60 at a free end thereof. That is, the private-mode and handsfree benders are incorporated into the same piezo-electric ceramic component.

Referring now to FIG. 7, a preferred embodiment of the dual-mode bender 60, includes, from top to bottom, a first conductive layer 72, a first piezo-electric ceramic layer 74, a ground plane 76, a second piezo-electric ceramic layer 78, and a second conductive layer 80.

The first conductive layer 72 includes a circular, conductive pad 72a that forms a free-end portion of the layer 72. A first conductive trace 72b extends from a lower edge of the layer 72 to the conductive pad 72a along a side edge of the layer 72. A second conductive pad 72c is electrically isolated from the first conductive pad 72a and trace 72b. The second conductive pad 72c extends from the lower edge of the layer 72 and forms a lower portion thereof. Likewise, the second conductive layer 80 includes a circular, conductive pad 80a that forms a free-end portion of the layer 80. A first conductive trace 80*b* extends from a lower edge of the layer 80 to the conductive pad 80*a* along a side edge of the layer 80. A second conductive pad 80*c* is electrically isolated from the first conductive pad 80*a* and trace 80*b*. The second conductive pad 80*c* extends from the lower edge of the layer 80 and forms a lower portion thereof.

The first piezo-electric ceramic layer 74 includes a lower portion 74*b* comprised of a piezo-electric ceramic material that drives the handsfree diaphragm 62. A separate, free-end portion 74*c* is comprised of a piezo-electric ceramic material that forms the private-mode transducer 68. As with the layer 74, the second piezo-electric ceramic layer 78 includes a lower portion 78*b* comprised of a piezo-electric ceramic material that drives the handsfree diaphragm 62. A separate, free-end portion 78*c* is comprised of a piezo-electric ceramic material that forms the private-mode transducer 68.

As with the first embodiment, the first and second conductive layers 72, 80 and ground plane 76 are preferably constructed of a mesh substrate material, such as nylon mesh, that is selectively plated with a conductive material, such as nickel plating. However, any suitable substrate and conductive coating (gold, brass, aluminum, etc.) is contemplated. The substrate materials can be selected to aid in the area of damping selectivity.

The damping characteristics of the bender 60 can be optimized by adding one or more elastomeric (e.g. rubber) layers to the bender 60. For instance, a conductive rubberized compound can be applied to one or both sides of one or more layers forming the bender 60, such as the ceramic layers 74, 78. Alternatively, the entire bender can be encased in a nonconductive rubberized compound. It is contemplated that the bender 60 can include any number of conductive, piezo-electric, and other layers to optimize the force per voltage characteristic of the bender.

The piezoelectric ceramic portions 74*b*, 78*b* are oppositely polarized so that when appropriate voltages are applied to the conductive pads 72*c*, 80*c* and ground plane 76, the ceramic portion 74*b* expands while the ceramic portion 78*b* contracts, thus causing the handsfree portion of the bender 60 to deflect in a forward direction. Likewise, when the appropriate voltages are applied to the conductive pads 72*c*, 80*c* and ground plane 76, the ceramic portion 74*b* contracts while the ceramic portion 78*b* expands, thus causing the handsfree portion of the bender 60 to deflect in a backward direction. Accordingly, the forward and backward deflecting motions of the handsfree portion of the bender 60 drive the diaphragm 62 to generate dispatch-level audio output.

The diaphragm 62 is attached to the bender 60 so that the diaphragm cavity 66 is positioned over the piezo-electric ceramic portions 74*c*, 78*c*, the conductive pads 72*a*, 80*a*, and the free-end portion of the ground plane 76. The piezo-electric ceramic portions 74*c*, 78*c*, the conductive pads 72*a*, 80*a*, and the free-end portion of the ground plane 76 cooperate to form the private-mode transducer 68. A central portion of the private-mode transducer 68 moves up and down within the diaphragm cavity 66 similar to an "oil-can" effect, depending on the polarity of the voltage applied. The volume of air in front of the private-mode transducer 68 within the cavity 66 can be tuned, in conjunction with the ports or private-mode openings in the center portion of the diaphragm, to achieve the desired private-mode response.

It should be appreciated that the dual mode bender configuration of FIGS. 5 to 7 does not adversely affect handsfree operating mode performance because most of the bending occurs in the half of the bender closest to the knuckle 18. It should also be appreciated that either of the dual-mode earpiece configurations 26, 56 of the present invention can aid in the poor low-frequency response typically achieved in a piezo-electric earpiece by operating the handsfree portion as a sub-woofer at very low levels in conjunction with the private mode earpiece.

In both dual-mode earpiece configurations 26, 56 of the present invention, the biggest space saving feature is the very low-compliance or high-stiffness of the handsfree transducer. This low-compliance allows the bender to be mounted in a very small acoustic space, such as that available with a small form factor cellular telephone. This is possible because the enclosed cavity of air acts as a stiffness to the transducer. A dynamic loudspeaker is by design a fairly compliant or flexible structure. When the volume of air that the transducer is mounted in decreases in size, the effective stiffness of that volume increases. Acoustically, enclosed air volumes are referred to as compliant elements, and likewise, the stiffness of a loudspeaker can be related back to a volume of air.

A typical micro-loudspeaker, such as those used in dispatch radios or speakerphones, has an effective air volume of 50 cubic centimeters or more. If a speaker such as this is mounted in an acoustic space smaller than this volume, the stiffness of the speaker system will be controlled by the acoustic space. Thus, the space may be acoustically too small to produce a desired bandwidth. A speaker mounted in a cavity of equivalent size or smaller than the equivalent air volume of the speaker will have its resonance raised considerably.

The cantilevered piezo-electric transducer of the present invention has an equivalent air volume that is orders of magnitude smaller that the volume of a flip portion associated with a conventional cellular telephone. Therefore, the effect of the flip volume on the transducer resonance is negligible. Because of this, whether the handsfree transducer of the present invention is used in conjunction with a private-mode speaker or not, it can produce an acceptable acoustic bandwidth in any reasonably small structure. Thus, the size of the acoustic space that the transducer of the present invention is mounted in has little effect on the response of the system. This makes the handsfree transducer of the present invention applicable to any small electronic device that requires a relatively high level of audio output.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof. For instance, it is contemplated that the private-mode transducer 38 can be a conventional dynamic speaker mounted within the cavity 36.

Having thus described the preferred embodiment(s), the invention is now claimed to be:

1. A device for generating dispatch-level audio output in a handsfree operating mode, the device comprising:
   a housing;
   a cantilevered bender having a first end and a second end, the first end of the bender being mounted to the housing;
   a diaphragm having a first end and a second end, the first end of the diaphragm being attached to the second end of the bender;

a surround joining the second end of the diaphragm to the housing; and the bender driving the diaphragm in a reciprocating manner to generate dispatch level audio output.

2. The device of claim 1, wherein the bender is multilayered.

3. The device of claim 1, wherein the bender includes at least one layer of piezo-electric material.

4. The device of claim 1, wherein the bender includes a plurality of alternating piezo-electric layers and conductive layers.

5. The device of claim 1, further including a second bender positioned within a cavity of the diaphragm for generating private-level audio output.

6. The device of claim 5, wherein the second bender is multilayered.

7. The device of claim 5, wherein the second bender includes at least one layer of piezo-electric material.

8. The device of claim 5, wherein the second bender includes a plurality of alternating piezo-electric layers and conductive layers.

9. The device of claim 1, further including a private-mode transducer positioned within a cavity of the diaphragm for generating private-level audio output.

10. The device of claim 1, wherein the cantilevered bender includes a first portion for driving the diaphragm and a second portion for generating private-level audio output.

11. A telecommunication device comprising:

a housing; and a dual earpiece arrangement associated with the housing, the dual earpiece arrangement including a handsfree transducer that generates dispatch-level audio output in a handsfree operating mode of the telecommunication device, and a private-mode transducer that generates private-level audio output in a private operating mode of the telecommunication device, wherein the handsfree transducer includes a cantilevered bender having a first end and a second end, the first end of the bender being mounted to the housing, a diaphragm having a first end and a second end, the first end of the diaphragm being attached to the second end of the bender, and a surround joining the second end of the diaphragm to the housing, wherein the bender drives the diaphragm in a reciprocating manner to generate dispatch level audio output.

12. The telecommunication device of claim 11, wherein the bender is multilayered.

13. The device of claim 11, wherein the bender includes at least one layer of piezo-electric material.

14. The device of claim 11, wherein the bender includes a plurality of alternating piezo-electric layers and conductive layers.

15. The telecommunication device of claim 11, wherein the private-mode transducer is positioned within a cavity of the diaphragm for generating private-level audio output.

16. The telecommunication device of claim 11, wherein the private-mode transducer includes a second bender positioned within a cavity of the diaphragm for generating private-level audio output.

17. The telecommunication device of claim 16, wherein at least one of the first-mentioned bender and the second bender includes a piezo-electric material.

18. A telecommunication device comprising:

a housing;

a dual earpiece arrangement associated with the housing, the dual earpiece arrangement including a handsfree transducer that generates dispatch-level audio output in a handsfree operating mode of the telecommunication device, and a private-mode transducer that generates private-level audio output in a private operating mode of the telecommunication device; and a piezo-electric ceramic bender having a first area that forms at least a portion of the handsfree transducer and a second area that forms at least a portion of the private-mode transducer.

19. The telecommunication device of claim 11, wherein at least one of the handsfree-mode transducer and the private-mode transducer is formed from a piezo-electric material.

20. The telecommunication device of claim 18, wherein the first area of the piezo-electric ceramic bender includes conductive pads formed as part of one or more conductive layers, and the second area of the piezo-electric ceramic bender includes conductive pads formed as part of one or more conductive layers, where the conductive pads of the first area are electrically isolated from the conductive pads of the second area.

21. The telecommunication device of claim 18, wherein the piezo-electric ceramic bender is a piezo-electric ceramic cantilever bender.

* * * * *